United States Patent [19]

Furukawa

[11] 4,421,426
[45] Dec. 20, 1983

[54] THRUST BEARING DEVICE

[75] Inventor: Yoshio Furukawa, Hitachi, Japan

[73] Assignee: Hitachi, Ltd., Tokyo, Japan

[21] Appl. No.: 313,502

[22] Filed: Oct. 21, 1981

[30] Foreign Application Priority Data

Oct. 29, 1980 [JP] Japan ............................ 55-150738

[51] Int. Cl.³ .............................................. F16C 17/06
[52] U.S. Cl. .................................. 384/219; 384/224;
384/225; 384/308
[58] Field of Search ............... 384/219, 224, 225, 308,
384/218, 306, 122

[56] References Cited

U.S. PATENT DOCUMENTS

| 3,259,441 | 7/1966 | Newell | 384/308 |
| 3,550,973 | 12/1970 | Kitano et al. | 384/224 |
| 3,620,582 | 11/1971 | Sato et al. | 384/224 |
| 3,829,179 | 8/1974 | Kurita et al. | 384/224 |

Primary Examiner—Lenard A. Footland
Attorney, Agent, or Firm—Antonelli, Terry & Wands

[57] ABSTRACT

A thrust bearing device including a bearing oil tank containing a lubricating oil, a plurality of bearing shoes for slidably journaling a rotary member located in the bearing oil tank, the bearing shoes each being segmental in shape, and a support device for the bearing shoes. The support device for the bearing shoes is interposed between the bearing shoes and the bottom of the bearing oil tank and immersed in the oil, including pressure receiving members each having spread-apart two legs, and resilient members. The pressure receiving member are each formed on its upper surface with a portion for supporting the associated bearing shoe and on its undersurface with the spread-apart two legs, one of the shoes being constructed to receive a lower thrust load than the other leg. The resilient members are each located beneath the leg of the associated pressure receiving member that has the lower thrust load applied thereto. The thrust bearing device is advantageous in that the support means is capable of withstanding high thrust loads and has high elasticity.

5 Claims, 6 Drawing Figures

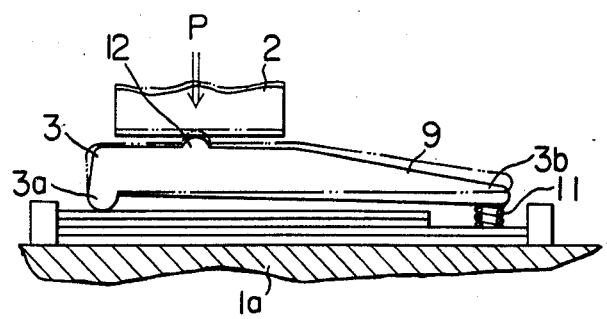
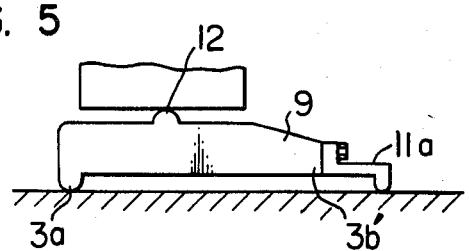
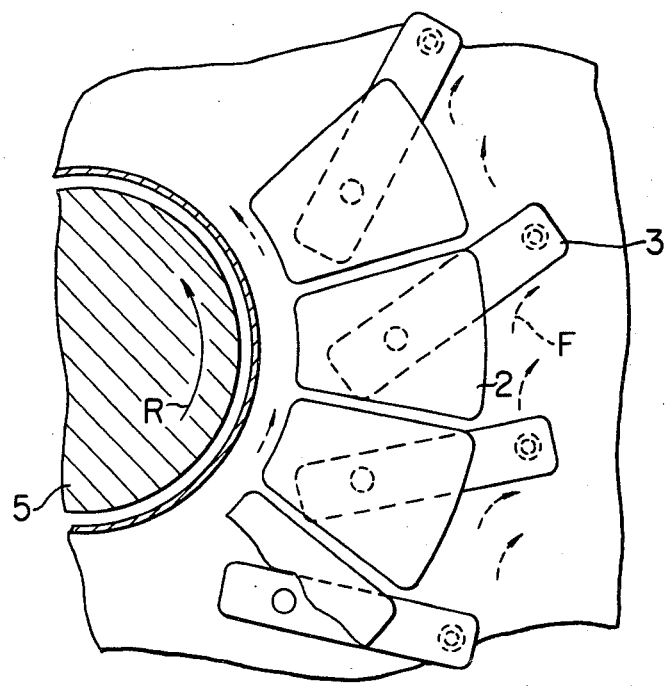

THRUST BEARING DEVICE

BACKGROUND OF THE INVENTION

This invention relates to improvements in or relating to thrust bearing devices used with vertical turbines, vertical pumps, vertical turbine-generators, etc., and, more particularly, to improvements in or relating to a thrust bearing device for a machine of high capacity provided with a plurality of bearing shoes of a segmental shape arranged around a rotary shaft and resiliently supported for free pivotal movement.

As is well known, a thrust bearing device of the aforementioned type generally for bearing thrust loads, is provided with a plurality of bearing shoes arranged around a rotary shaft which are each usually supported at one point by a bolt having a spherical head or by a spring also having a spherical head, to meet the requirement that a bearing oil film should be formed on each bearing shoe.

Bolts and springs are used each for supporting one of the plurality of bearing shoes in order that the same thrust load may be carried by all the bearing shoes. In support means using bolts, the heights of the bolts can be adjusted as desired to bring the sliding surfaces of all the bearing shoes to the same level. The use of the springs enables, when the sliding surfaces of the bearing shoes become slightly unbalanced in height, the condition to be compensated for by the resilience of the springs.

The most important thing for this type of bearing device is that a uniform oil film be formed between the rotary member and the sliding surfaces of the bearing shoes at all times. To attain this end, support means for the bearing shoes should be constructed such that it is possible to adjust the heights of the sliding surfaces of the bearing shoes so that no particular bearing shoes may have concentrated thrust loads applied thereto and that the bearing shoes can move independently on their own accord.

The higher the load applied to a machine or the higher the capacity of a machine, the higher accuracy is required in adjusting the heights of the bearing shoes. For this reason, it has been usual practice to use springs that can be adjusted for the support means for the thrust bearing device used with a machine of high capacity.

In, for example, Japanese Utility Model Publication No. 8805/68, one type of support means adopted for use with a machine of high capacity is proposed which is regarded as being relatively effective, wherein each bearing shoe is supported by a resilient underlying pressure receiving member formed on its upper surface with a projection for supporting the bearing shoe and on its undersurface with legs each located at one of opposite ends thereof.

The above-noted support means can perform its function without any trouble when used for supporting bearing shoes for journaling an ordinary rotary member. However, when this support means is used for supporting bearing shoes for journaling the rotary member of a machine of high capacity, it is necessary to increase the strength of resilient underlying pressure receiving members because of the high load applied thereto. The end of increasing the strength of the underlying pressure receiving members might be attained by increasing the width or thickness of each underlying pressure receiving member or using material of higher strength for forming each underlying pressure resisting member. However, since the underlying pressure receiving members cannot perform their function satisfactorily unless they are resilient to a certain extent and, in view of the fact, that available space is limited, it is difficult to readily solve the problem. Generally, the pressure receiving members are flexed about 1 mm. If the length of each pressure receiving member is increased to suit the condition of use with a machine of high capacity in a limited range, difficulties would be experienced in allowing for the flexing of 1 mm.

SUMMARY OF THE INVENTION

This invention has been developed for the purpose of obviating the aforesaid disadvantages of the prior art. Accordingly the invention has as its object the provision of a thrust bearing device provided with support means, both sturdy and elastic, which has sufficiently high mechanical strength and can be flexed sufficiently without using a complex construction to function satisfactorily even when placed in a limited space in service.

The aforesaid object of the invention can be accomplished by using support means comprising underlying pressure receiving members each formed on the upper surface thereof with a portion for pivotally supporting one of bearing shoes and on the undersurface thereof with two spread-apart legs each located at one of opposite ends thereof, and resilient members each located beneath one of the pressure receiving members, and with one of the legs of each pressure receiving member being constructed to bear a lower thrust load than the other leg and each resilient member being located beneath the leg for bearing the lower thrust load.

BRIEF DESCRIPTION OF THE DRAWINGS

FIGS. 3 and 4 are cross-sectional views, on an enlarged scale, taken along the line III—III in FIG. 2;

FIG. 5 is a vertical cross-sectional side view of the thrust bearing device comprising another embodiment of the invention; and FIG. 6 is a sectional view showing a modification of the thrust bearing device shown in FIG. 2.

DESCRIPTION OF THE PREFERRED EMBODIMENTS

Figure 1:
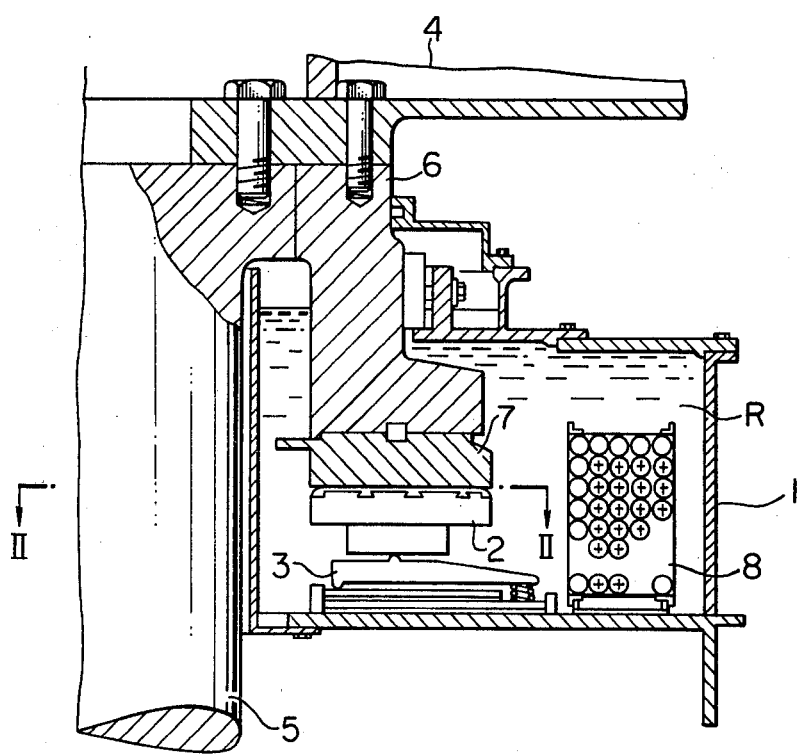
FIG. 1 is a vertical cross-sectional side view of a rotary machine provided with the thrust bearing device comprising one embodiment of the invention.
Figure 2:
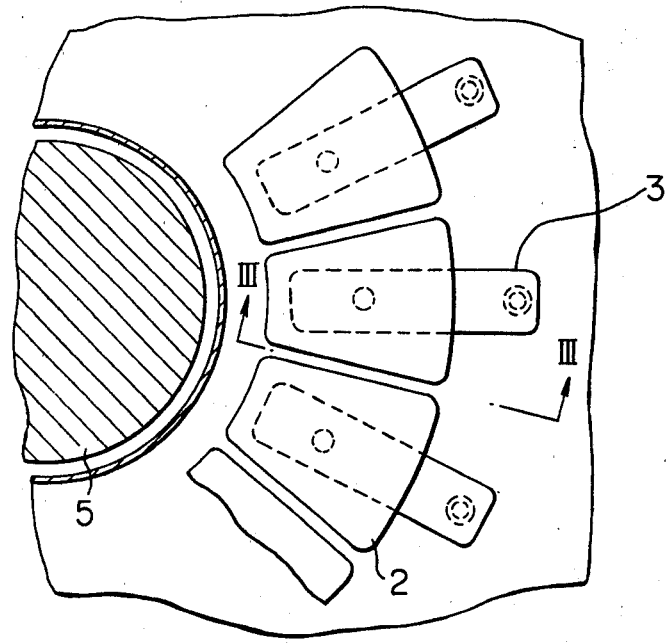
FIG. 2 is a cross-sectional view taken along the line II—II in FIG. 1.

Referring now to the drawings and, in particular, FIGS. 1 and 2 the thrust bearing device, used with a turbine-generator comprises a bearing oil tank 1, bearing shoes 2, support means 3 and a rotary member 4.

The rotary member 4 includes a thrust bearing 6 formed unitarily with a rotary shaft 5 and having secured to its forward end by key means a runner 7 which rotates with the rotary shaft 5 as a unit.

The bearing oil tank 1 forms an annular oil tank chamber R around the rotary shaft 5 and contains therein the bearing shoes 2 and the support means 3 therefor as well as a lubricating oil and a cooler 8 for cooling the lubricating oil.

The bearing shoes 2 are each segmental in shape and supported on the support means 3 for tilting or pivoting movement. The bearing shoes 2 of the segmental shape are provided in a suitable number and arranged arond the rotary shaft 5 by forming a concentric circle there-with. The bearing shoes 2 are mounted at the same height so that all of them smoothly contact the undersurface of the runner 7.

Figure 3:
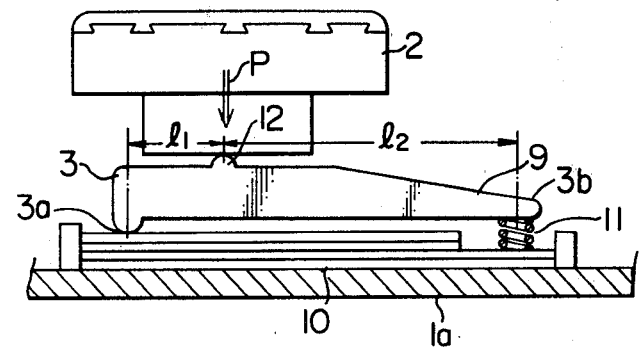

Adjustments of the heights of the bearing shoes 2 are effected by the support means 3. More specifically, as shown in FIG. 3, the support means 3 comprises underlying pressure receiving members 9 each having two spread-apart two legs 3a and 3b at opposite ends thereof, a liner 10 underlying the pressure receiving members 9 and resilient members 11 each interposed between one of the pressure receiving members 9 and the liner 10.

The underlying pressure receiving members 9 are each mounted below one of the bearing shoes 2. The pressure receiving members 9 each have a special shape to suit the condition of use. As can be clearly seen in FIG. 3, one of the two legs 3a and 3b located at the opposite ends or the leg 3a in the embodiment shown is formed as a rigid leg for directly transmitting a thrust load P applied by the rotary member while the other leg or the leg 3b has one of the resilient members 11 mounted between it and the liner 10, so as to transmit the load P through the resilient member. In this embodiment, the pressure receiving members 9 are each formed on the upper surface thereof with a support protuberance 12 which is located near the rigid leg 3a. Stated differently, the pressure receiving members 9 are each constructed to have a higher thrust load applied to the rigid leg 3a than to the other leg 3b.

The ratio of the distance $l_1$ between the rigid leg 3a and the support protuberance 12 to the distance $l_2$ between the support protuberance 12 and the other leg 3b ($l_1/l_2$) may vary depending on the dimension of the machine or the magnitude of the thrust load. The results of experiments conducted show that satisfactory results can be achieved with a ratio of about 1/25 in a turbine-generator of the 400,000 Kw class which is considered to be of high capacity. The resilient members 11 may be of any form as desired. However, it has been ascertained that oil springs can be most advantageously used for operation in the bearing oil tank.

As shown in a somewhat exaggerated manner in FIG. 4, the support means 3 of the construction of FIGS. 1 and 2 operates such that the major part of the thrust load P transmitted from each bearing shoe 2 to the associated underlying pressure receiving member 9 is carried by the rigid leg 3a and transmitted to an oil tank bottom 1a because the rigid leg 3a is located near the support protuberance 12. Meanwhile no high thrust load is applied to the other leg 3b, so that the resilient member need not be very sturdy and an ordinary spring may serve the purpose without the danger of being damaged. Since high thrust load is carried by the rigid leg 3a, the portion of each pressure receiving member 9 near this leg can be constructed to be rigid because no elasticity is required. The leg 3b which bears the thrust load with elasticity need not have high sturdiness because the load applied thereto is not high, making it possible to give enough elasticity to the portion of each pressure receiving member 9 near the leg 3b.

In the embodiment shown and described hereinabove in connection with FIGS. 1-4, the legs 3a and 3b of each pressure receiving member 9 are spread apart in a radial direction with respect to the rotary shaft 5, and each resilient member 11 is located beneath the leg 3b disposed on the outer radial side. This arrangement enables each pressure receiving member 9 to extend in a direction in which there is relatively ample space while a shorter portion of the pressure receiving member is located on the inner radial side of the associated bearing shoe 2, so that the same bearing oil tank 1 as previously employed can be used. It is advantageous that no bearing oil tank 1 of special shape and construction is required. The arrangement whereby each resilient member 11 is located near the leg of the pressure receiving member located on the radial outer side is advantageous in operation because assembling and maintenance of the resilient members 11 can be carried out without disassembling the bearing shoes 2.

In the foregoing description, the support means 3 has been described by referring to one embodiment. However, it is to be understood that many modifications may be made therein.

For example, as shown in FIG. 5 each pressure receiving member 9 has one leg or the leg 3b' of the low load side having a resilient member or plate spring 11a secured thereto.

In the construction shown in FIG. 5, no high load is applied to the plate spring or the resilient member 11a, so that the leg 3b' can have enough resilience while providing strong support to enable the bearing support device to function satisfactorily.

In FIG. 6 the position in which the legs of each pressure receiving member are spread apart differ from the embodiment of FIGS. 1-4. More specifically, in the embodiment of FIG. 6, the legs of the pressure receiving member 9 are spread apart in a direction which is slightly inclined with respect to a direction of rotation indicated by an arrow R of the rotary shaft 5. By this arrangement, the distance covered by the spread-apart legs in the radial direction is reduced even if the legs are spread spart the same distance. This makes it possible to mount pressure receiving members 9 of larger length in the bearing oil tank 1 without increasing its diameter. The pressure receiving members 9 shown in FIG. 6 have applied thereto sliding forces oriented in the direction of the thrust and in the direction of rotation of the rotary member 5. Thus, the loads applied to each pressure receiving member 9 are oriented longitudinally thereof, so that the spread-apart legs thereof have increased stability and the pressure receiving member can be readily fixed in position. An additional effect achieved by the pressure receiving members 9 shown in FIG. 6 is that the lubricating oil flows, in the direction indicated by the arrows F, smoothly toward the outer side of the tank 1 in which the cooler is located, to thereby enable the lubricant to shift smoothly without remaining stagnant.

From the foregoing description, it will be appreciated that the thrust bearing device according to the invention comprises support means for the bearing shoes 2 including pressure receiving members 9 each having load applied to its upper surface from the associated bearing shoe 2 and formed on its undersurface with legs 3a, 3b, or 3a, 3b' each located at one of opposite ends thereof, and resilient members 11 or 11a each resiliently supporting one of the legs 3b' of the associated pressure receiving member. The other leg 3a is constructed to bear higher thrust loads than the one leg which is resiliently supported by the associated resilient member mounted between the pressure receiving member and the bottom of the oil tank. Thus, the thrust bearing device according to the invention is provided with support means which is capable of withstanding high thrust loads because it has sufficiently high mechanical strength and elasticity to enable the thrust bearing device to function satisfactorily.

What is claimed is:

1. A thrust bearing device comprising:
a plurality of bearing shoes arranged around a rotary shaft for slidaly journaling a rotary member, said bearing shoes each being segmental in shape;
support means for resiliently supporting each of said bearing shoes for free pivotal movement; and
a bearing oil tank containing a lubricating oil and enclosing said bearing shoes and said support means; wherein the improvement resides in said support means comprising underlying pressure receiving members each formed on its upper surface with a portion for pivotally supporting the associated bearing shoe and on its undersurface with two spread-apart legs each located at one of opposite ends thereof, and resilient members each located beneath one of said pressure receiving members, one of said legs of each of said pressure receiving members being constructed to bear a lower thrust load than the other leg and each of said resilient members being located beneath the leg for bearing the lower thrust load.

2. A thrust bearing device as claimed in claim 1, wherein said two legs extend radially of the rotary shaft, with the leg receiving the lower thrust load being located on a radially outer side of the rotary shaft.

3. A thrust bearing device as claimed in claim 1, wherein said resilient members each comprise a coil spring.

4. A thrust bearing device as claimed in claim 1, wherein direction in which said legs of each said underlying pressure receiving member extends is inclined with respect to a direction of rotation of said rotary member.

5. A thrust bearing device as claimed in claim 4, wherein each of said pressure receiving member is arranged such that the leg receiving a lower thrust load is located on an outer side thereof.

* * * * *